US008160451B2

(12) United States Patent
Liu et al.

(10) Patent No.: US 8,160,451 B2
(45) Date of Patent: Apr. 17, 2012

(54) OPTICAL NETWORK UNIT TRANSCEIVER MODULE WITH ARRAYED I/O VIDEO CONTACTS

(75) Inventors: Jinxiang Liu, Bukit Batok (SG); Tat Ming Teo, Compassvale Link (SG)

(73) Assignee: Finisar Corporation, Inc., Sunnyvale, CA (US)

( * ) Notice: Subject to any disclaimer, the term of this patent is extended or adjusted under 35 U.S.C. 154(b) by 683 days.

(21) Appl. No.: 12/030,555

(22) Filed: Feb. 13, 2008

(65) Prior Publication Data
US 2008/0193140 A1 Aug. 14, 2008

Related U.S. Application Data

(60) Provisional application No. 60/889,722, filed on Feb. 13, 2007.

(51) Int. Cl.
 *H04B 10/00* (2006.01)
(52) U.S. Cl. ............ 398/138; 398/139; 398/135
(58) Field of Classification Search ........... 398/135–139
See application file for complete search history.

(56) References Cited

U.S. PATENT DOCUMENTS

| | | | |
|---|---|---|---|
| 5,408,559 A | | 4/1995 | Takahashi et al. |
| 5,416,871 A | * | 5/1995 | Takahashi et al. .......... 385/88 |
| 5,475,783 A | * | 12/1995 | Kurashima .................. 385/92 |
| 5,528,408 A | * | 6/1996 | McGinley et al. .......... 398/139 |
| 5,596,665 A | * | 1/1997 | Kurashima et al. ......... 385/92 |
| 5,611,006 A | * | 3/1997 | Tabuchi ...................... 385/14 |
| 5,867,622 A | | 2/1999 | Miyasaka et al. |
| 6,106,160 A | * | 8/2000 | Kikuchi et al. .............. 385/88 |
| 6,200,041 B1 | * | 3/2001 | Gaio et al. .................. 385/92 |
| 6,220,878 B1 | * | 4/2001 | Poplawski et al. ......... 439/92 |
| 6,282,000 B1 | | 8/2001 | Kikuchi et al. |
| 6,369,924 B1 | * | 4/2002 | Scharf et al. ............... 398/117 |
| 6,493,121 B1 | | 12/2002 | Althaus |
| 6,571,033 B2 | * | 5/2003 | Caracci et al. .............. 385/24 |
| 6,731,882 B1 | | 5/2004 | Althaus et al. |
| 6,954,592 B2 | * | 10/2005 | Tan et al. ................... 398/138 |
| 7,184,621 B1 | | 2/2007 | Zhu |
| 7,369,776 B2 | | 5/2008 | Masahiko |

(Continued)

FOREIGN PATENT DOCUMENTS

JP          9211258          8/1997

OTHER PUBLICATIONS

Huang et al 'Optical Trancievers for Fiber-to-the-Premises Applicayions: System Requirements and Enabling Technologies' Journal of lightwave technology, vol. 25 No. 1 Jan. 2007, pp. 11-27.

(Continued)

*Primary Examiner* — Agustin Bello
(74) *Attorney, Agent, or Firm* — Maschoff Gilmore & Israelsen

(57) ABSTRACT

Pluggable ONU transceiver modules are disclosed that include an optical connector configured to connect to an optical network. The pluggable ONU transceiver modules further includes a transmit line including a laser driver and a laser. The pluggable ONU transceiver modules further includes a first receive line including a first optical receiver and a first post amplifier. The pluggable ONU transceiver modules further includes a second receive line including a second optical receiver and a second post amplifier. The pluggable ONU transceiver modules further includes a combined input/output (I/O) and video contacts electrically coupled to the laser driver, first post amplifier, and second post amplifier.

19 Claims, 3 Drawing Sheets

U.S. PATENT DOCUMENTS

| | | | |
|---|---|---|---|
| 7,450,858 B2 | 11/2008 | Verdiell | |
| 7,520,682 B2 | 4/2009 | Eom et al. | |
| 7,556,439 B2 | 7/2009 | Nakanishi et al. | |
| 7,664,405 B2 * | 2/2010 | Paulson | 398/164 |
| 7,783,195 B2 * | 8/2010 | Riggsby | 398/67 |
| 7,995,928 B2 * | 8/2011 | Du et al. | 398/138 |
| 2003/0147601 A1 | 8/2003 | Bartur et al. | |
| 2005/0041933 A1 * | 2/2005 | Meadowcroft et al. | 385/92 |
| 2005/0201665 A1 | 9/2005 | Manderschiel | |
| 2006/0083514 A1 | 4/2006 | Liu et al. | |
| 2007/0058976 A1 * | 3/2007 | Tatum et al. | 398/99 |
| 2008/0247766 A1 * | 10/2008 | McCaul et al. | 398/202 |

OTHER PUBLICATIONS

CN 200880010772.6 Office Action Mailed Aug. 24, 2010.

PCT/US2008/054017 International Search report mailed Jun. 30, 2008.

U.S. Appl. No. 12/031,234 Notice of Allowance mailed May 27, 2011.

U.S. Appl. No. 12/034,234 Notice of Allowance mailed Apr. 28, 2011.

U.S. Appl. No. 12/034,234 Non Final Office Action mailed Dec. 1, 2010.

* cited by examiner

OPTICAL NETWORK UNIT TRANSCEIVER MODULE WITH ARRAYED I/O VIDEO CONTACTS

CROSS-REFERENCE TO RELATED APPLICATIONS

This application claims the benefit of U.S. Provisional Patent Application Ser. No. 60/889,722, filed Feb. 13, 2007, the contents of which are hereby incorporated by reference herein.

BACKGROUND

Interest in broadband optical access networks is growing, driven by an increasing demand for high-speed multimedia services. Optical access networks are often referred to as fiber-to-the-curb (FTTC), fiber-to-the-building (FTTB), fiber-to-the-premise (FTTP), or fiber-to-the-home (FTTH). Each such network provides an access from a central office to a building, or a home, via optical fibers. As the transmission quantity of such an optical cable is much greater than the bandwidth actually required by each subscriber, a passive optical network (PON) shared between many subscribers through a splitter was developed.

Referring to FIG. 1, a conventional optical network unit ("ONU") transceiver module 100 is shown. The ONU transceiver module 100 includes input/output (I/O) pins 105 that are plugged or soldered to the ONU box's internal printed circuit board (PCB) (not shown). The ONU transceiver module includes a RF connector 110 for a RF cable to connect to the ONU transceiver module 100. More specifically, typical ONU transceiver modules 100 have 20 I/O pins in a row protruding from the bottom of the ONU transceiver modules 100 and the separate standard RF connector 110 for transmission of an electrical video signal. One example of a standard RF connector used is a SubMiniature B ("SMB") connector that protrudes from a side of the ONU transceiver module 100. The ONU box (not shown) to which the ONU transceiver module 100 connects has a RF cable that is plugged into the module's RF connector 110 to tap RF video signals from the ONU transceiver module 100.

Referring to FIG. 2, another typical ONU transceiver module 200 includes I/O pins 205 and an RF connector 210 with pins which protrude out the base of the ONU transceiver module 200 and are connected to the ONU transceiver module's 200 internal PCB (not shown). The RF connector 210 includes pins that protrude out from the bottom of the module and are also connected onto the ONU box's PCB within which the ONU transceiver module is assembled. A large disadvantage of this previous design is the need to align the RF signal connector's 210 pins as well as the array of I/O pins 210 into holes on the ONU box's PCB. The previous designs also typically require additional soldering processes to solder the RF connector pins to the ONU box's PCB. Thus, what would be advantageous is a simplified means of connection for ONU transceiver modules.

The subject matter claimed herein is not limited to embodiments that solve any particular disadvantages or that operate only in particular environments such as those described herein. Rather, such environments and disadvantages are provided only to illustrate examples of technology areas in which several embodiments may be practiced.

BRIEF SUMMARY OF SEVERAL EXAMPLE EMBODIMENTS

A pluggable ONU transceiver module is disclosed that includes an optical connector configured to connect to an optical network. The pluggable ONU transceiver module further includes a transmit line including a laser driver and a laser. The pluggable ONU transceiver module further includes a first receive line including a first optical receiver and a first post amplifier. The pluggable ONU transceiver module further includes a second receive line including a second optical receiver and a second post amplifier. The pluggable ONU transceiver module further includes an electrical interface including combined input/output (I/O) and video contacts electrically coupled to the laser driver, first post amplifier, and second post amplifier.

According to another embodiment, a pluggable ONU transceiver module includes an optical connector configured to receive an end of an optical fiber to access an optical network. The pluggable ONU transceiver module further includes a transmit line. The transmit line includes a laser driver and a laser configured to generate a signal having a wavelength of about 1310 nanometers. The pluggable ONU transceiver module further includes a first receive line. The first receive line includes a photodiode configured to receive an optical signal having a wavelength of about 1550 nanometers and a first transimpedance amplifier (TIA). The pluggable ONU transceiver module further includes a second receive line. The second receive line includes a second photodiode configured to receive an optical signal having a wavelength of about 1490 nanometers and a second TIA. The pluggable ONU transceiver module further includes a single electrical interface including combined I/O and video contacts electrically coupled to the laser driver, first post amplifier, and second post amplifier. The transmit line is configured to transmit a digital optical data signal to the optical network. The first receive line is configured to receive a digital optical data signal from the optical network. The second receive line is configured to receive an analog optical video signal from the optical network.

These and other aspects of the present invention will become more fully apparent from the following description and appended claims.

BRIEF DESCRIPTION OF THE DRAWINGS

To further clarify the above and other aspects of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SEVERAL EMBODIMENTS

This invention combines the RF video signal contacts and the module's electrical I/O contacts into an array of electrical leads or contacts which can be plugged to the ONU box's PCB, or alternatively connected to the ONU Box's PCB via a separate receptacle. The invention combines the RF video pins, which transmit the RF video signal, together with the rest of the I/O pins of the module. For example, the combined pins can reside in an array which facilitates easy assembly, easy manufacture, and easy connection with the ONU transceiver.

Further to the above described arrangement, the combined I/O pins can be in the form of pluggable electrical leads which can be connected to the ONU box's PCB via a receptacle. The above described connector has features that are able to securely hold the pluggable ONU transceiver module on the PCB. The connector can also include features that enable the mounting of heat dissipative components, such as heat sinks, on top of the module.

Figure 1:
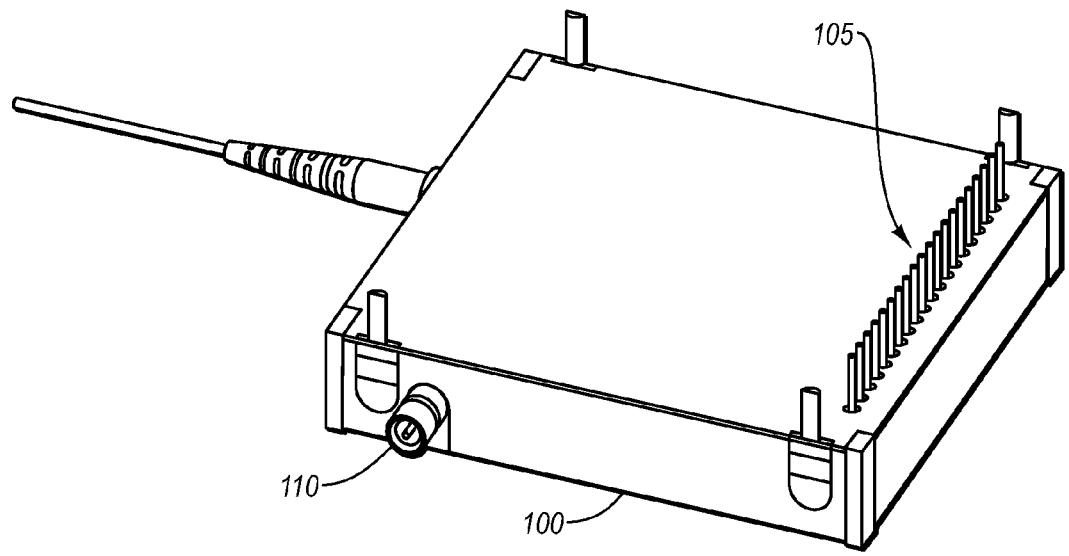
FIG. 1 illustrates a conventional ONU transceiver module.
Figure 2:
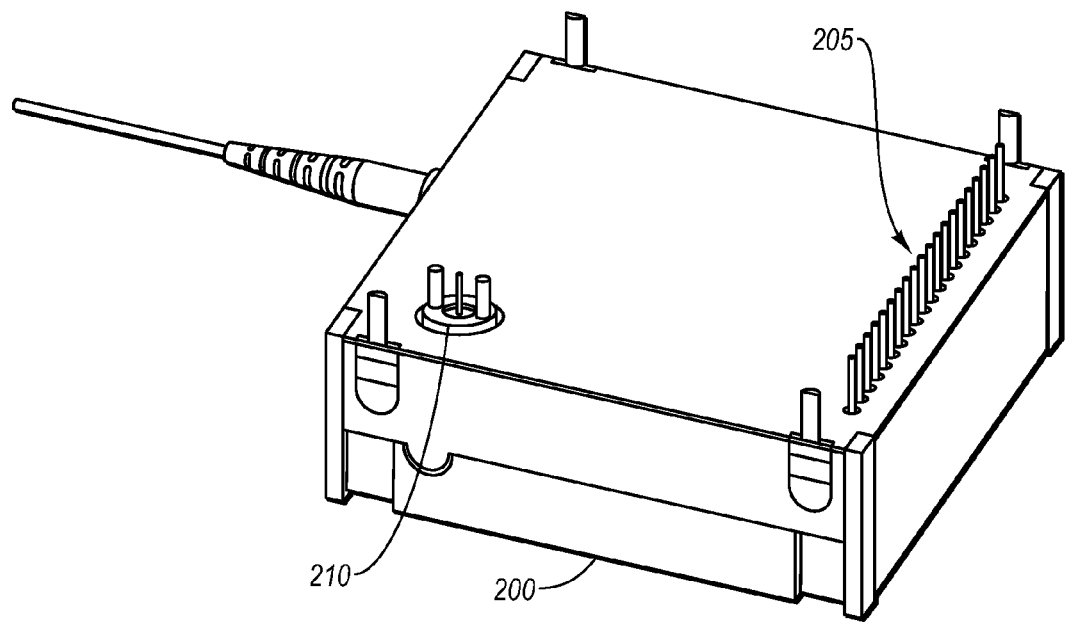
FIG. 2 illustrates another conventional ONU transceiver module.
Figure 3:
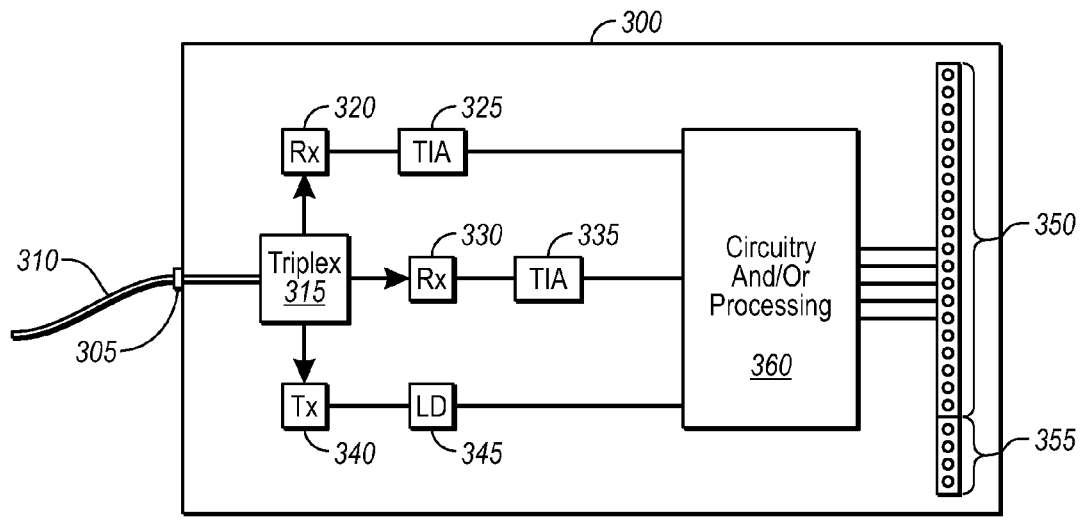
FIG. 3 discloses some of the components that may be found in a pluggable ONU transceiver module according to the invention.

FIG. 3 illustrates some of the components that may be found in a pluggable ONU transceiver module 300. The pluggable ONU transceiver module 300 can include an optical connector 305 configured to connect to an optical network via a single optical fiber 310 for both upstream and downstream optical communication over the single fiber 310. The single fiber 310 can be a single mode fiber, such as a SMF-28E fiber. The single fiber 310 can also include a fiber pigtail connecting the pluggable ONU transceiver module 300 to the network via another fiber optical connection at another end of the fiber pigtail.

The pluggable ONU transceiver module 300 includes an optical triplexer 315 for separating received optical signals from the optical network and for transmitting a transmit optical signal to the optical fiber. For example, the pluggable ONU transceiver module 300 can include a triplexer including collimating ball lenses and wavelength selective filters as disclosed in U.S. Provisional Patent Application 60/889,912, filed Feb. 14, 2007, the contents of which are hereby incorporated by reference herein. Additional details regarding an example triplexer are described with respect to FIGS. 5A-5B.

The pluggable ONU transceiver module 300 further includes a first receive line including a first optical receiver 320, such as a first photodiode. The first receive line further includes a first TIA 325 for amplifying an electrical data signal generated by the first optical receiver 320 from a received optical data signal. The pluggable ONU transceiver module 300 further includes a second receive line including second optical receiver 330, such as a second photodiode. The second receive line further includes a second TIA 335 for amplifying an electrical video signal generated by the second optical receiver 330. The pluggable ONU transceiver module 300 further includes a transmit line including a laser 340 for generating an optical data signal from an electrical data signal received from a laser driver 345. Thus, the pluggable ONU transceiver module is configured to transmit and receive digital data signals over the first receive line and the transmit line. The ONU transceiver module is also configured to receive analog video signals over the second receive line.

The pluggable ONU transceiver module further includes a combined I/O and video interface. The combined I/O and video interface includes combined I/O and video contacts 350 and 355 electrically coupled directly, or indirectly via additional circuitry and/or a processor 360, to the laser driver 345, first post amplifier 325 and the second post amplifier 335. As shown in FIG. 3, the combined I/O and video contacts 350 and 355 can include a single linear array of electrical contacts. The analog video contacts 355 can be disposed at an end of the single linear array of electrical contacts or can be configured in a different arrangement.

The laser 340, first optical receiver 320, and second optical receiver 330 each have a different associated wavelength so that the signals received and transmitted thereby may be triplexed. The wavelength associated with the laser 340, first optical receiver 320 and second optical receiver 330 can be any wavelength between 375 nanometers and 1800 nanometers. For example, the wavelengths associated with the laser 340, first optical receiver 320, and second optical receiver 330 can be about 1310 nanometers, about 1490 nanometers, and about 1550 nanometers. The laser can be associated with a signal wavelength of about 1310 nanometers, the first photodiode receiving analog video signals can be associated with a signal wavelength of about 1550 nanometers, and the second photodiode receiving digital data signals can be associated with a signal wavelength of about 1490 nanometers. For example, about 1310 nanometers can refer to wavelengths between 1290 and 1330 nanometers, about 1490 nanometers can refer to wavelengths between 1480 and 1500 nanometers, and about 1550 nanometers can refer to wavelengths between 1540 and 1560 nanometers.

The video signal can be a CATV video signal which ranges between 55 megahertz and 870 megahertz. The optical video signal can be an internet protocol television (IPTV) signal. The digital data signals can transmit digital data at rates between 1 and 10 Gbp/s 1 or more. For example, the second photo diode can receive data transmitted at rates of about 2.5 Gbp/s and the laser can transmit digital data at rates of about 1.25 Gbp/s.

Figure 4:
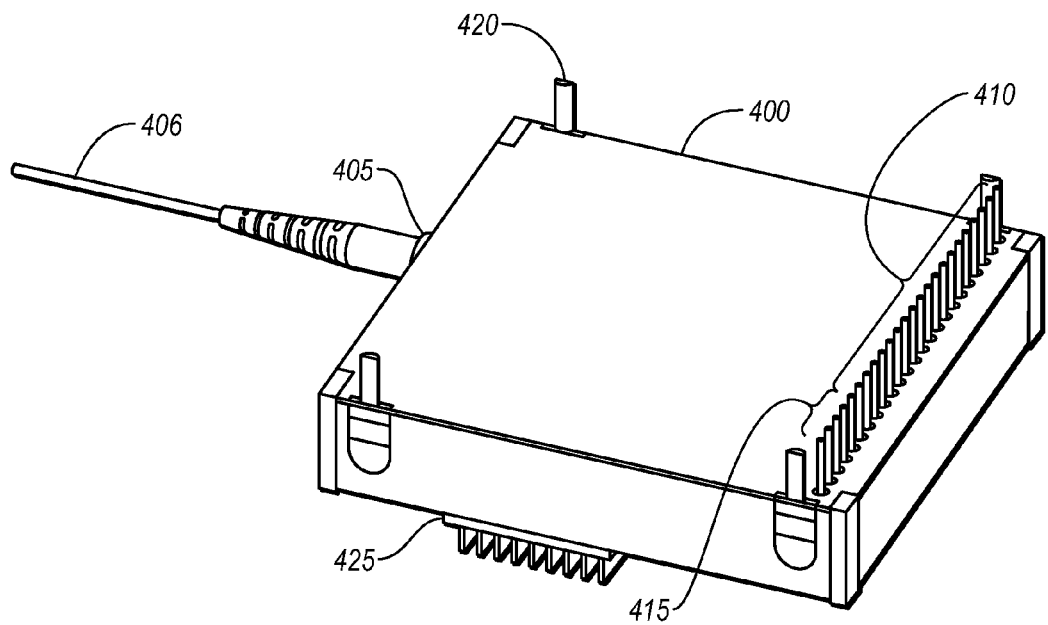
FIG. 4 discloses another example of a pluggable ONU transceiver according to the invention.

Referring to FIG. 4, an example of a pluggable module 400 ONU transceiver is illustrated. The pluggable ONU transceiver module 400 includes an optical connector 405 configured to connect to an optical fiber 406 to access an optical network. The pluggable ONU transceiver module 400 further includes a transmit line (not shown, see FIG. 3) for converting an electronic data signal to an optical data signal and transmitting the optical data signal to the optical network. The transmit line includes a laser driver and a laser. Examples of lasers include edge emitting lasers, such as double heterostructure, quantum well, strained layer, distributed feedback, and distributed Bragg reflector lasers. Further examples of lasers include vertical cavity surface-emitting laser (VCSELs) which have vertical laser cavities that emit light normal to the plane of the semiconductor device.

The pluggable ONU transceiver module 400 further includes a first receive line (not shown, see FIG. 3) for receiving a first optical data signal from the optical network and for converting the optical signal to an electrical signal. The first receive line includes a first photodiode and a first post amplifier for amplifying the electrical signal generated by the first photodiode. Other examples of optical receivers that may be used are avalanche photodetectors and metal-semiconductor-metal detectors. The pluggable ONU transceiver module 400 further includes a second receive line (not shown, see FIG. 3) for receiving an optical video signal from the optical network. The second receive line includes a second photodiode and a second post amplifier for amplifying the electrical signal generated by the second photodiode.

The pluggable ONU transceiver module 400 further includes a combined I/O and video interface 410 and 415. The combined I/O and video interface includes contacts coupled either directly or indirectly via additional circuitry and/or a via a processor to the laser driver, first post amplifier, and second post amplifier. Therefore, the combined I/O and video interface 410 and 415 provides an array of electrical contacts for electrical connection to the pluggable ONU transceiver module 400.

The combined I/O and video contacts 410 and 415 can be in the form of a single linear array of electrical contacts as illustrated in FIG. 4. The contacts associated with the video signal 415 can be disposed at an end of the single linear array of electrical contacts and the contacts associated with the input and output data signals 410 can be disposed next to the contacts associated with the video signal 415. The contacts associated with the input and output data signal 410 can include twenty or more contacts. The contacts associated with the video signal 415 can include 1, 2, 3, 4, or more contacts.

As illustrated in FIG. 4, the array of electrical contacts 410 and 415 can be configured as a single linear array of individual pins that are each physically spaced apart from one another. The individual pins also extend from the ONU transceiver module 400 at an orientation that is about perpendicular to a plane in which the transmit line, the first receive line, and the second receive line of the ONU transceiver module 400 are positioned (see FIG. 3). Further, as illustrated in FIG. 4, the pins in the single linear array of individual pins can be spaced apart from one another at substantially regular intervals. The single linear array of individual pins can be configured to be plugged into a corresponding receptacle. For example, the receptacle can be connected to an ONU box's PCB, and the pluggable ONU transceiver module 400 can be connected to the PCB via a simple slip connection of the combined I/O and video interface 410 and 415 and the single receptacle without requiring additional soldering or additional alignment steps and without requiring an additional RF cable. The ONU transceiver module 400 can include a heat dissipative component 425, such as fins or a heat sink, disposed on a top surface of the ONU module 400. Alternatively, the fins or heat sink can be embodied on the receptacle connector that receives the pluggable ONU transceiver module. The pluggable ONU transceiver module 400 can further include tabs 420 configured to aid in aligning the combined I/O and video contacts 410 and 415 with a receptacle of a ONU box's PCB. Alternative to the example of a pluggable module shown in FIG. 4, a pluggable ONU transceiver could also take the form of PCB edge mount connection which similar to the concept of a pluggable transceiver used in the Small Form-factor Pluggable (SFP) transceiver.

The invention can relieve the difficulty when mounting the pluggable ONU transceiver module onto the ONU box's PCB. As discussed above, currently one needs to aim and align the separate transceiver I/O pins and the RF video pins to the ONU box's PCB during the assembly, or use a separate RF video cable.

The ONU transceiver module can represent a physical layer module with DDM reporting various optical and electrical states of the ONU transceiver module. The ONU transceiver module can be designed to support the GPON (Gigabit PON) G.984 application. The ONU transceiver module can operate at 2.488 Gbit/s downstream and 1.244 Gbit/s upstream. The ONU transceiver module can include integrated thin film filters supporting triple-play at 1310 nm digital transmission, 1490 nm digital reception, and 1555 nm analog reception. The ONU transceiver module can include a burst-mode transmitter with a DFB laser. The ONU transceiver module can have a continuous mode avalanche photodiode for the digital signal reception and an analog PIN receiver for video overlay. The ONU transceiver module can have a 2"×2" package size with fiber pigtailed SC/APC connector compliant with UL94V0 and ITL certified GR326. The ONU transceiver module can include a 3.3 volt supply for the digital lines and a 12 volt supply for the analog line. The ONU transceiver module can include digital diagnostic functions available via a 2-wire serial bus. The digital diagnostics can be RoHS 5/6 compliant with leaded solder.

The invention, when designed using the pluggable configuration which connects the ONU box's PCB via a connector can also eliminate the soldering process needed to solder the connecting leads to the PCB. The invention may reduce the steps the ONU customer needs to complete connection to receive the RF video signals. The invention may also eliminate the use of a RF cable, which is used to connect to the RF connector of the pluggable ONU transceiver module thereby possibly making use of the pluggable ONU transceiver module more cost effective.

Figure 5A:
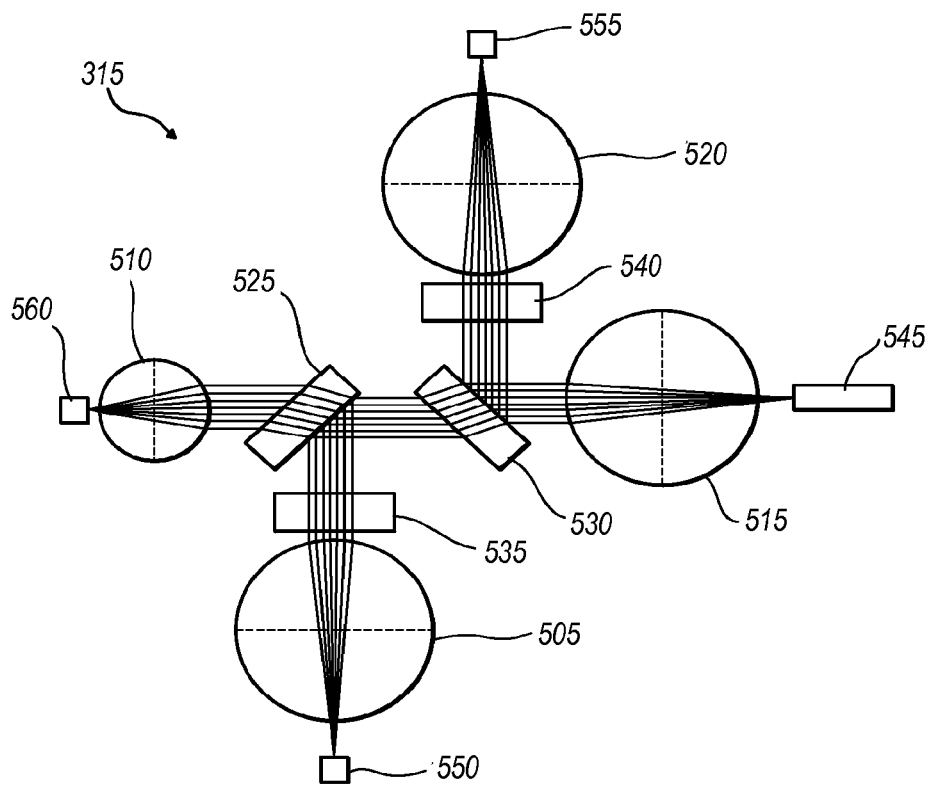
FIGS. 5A-5B disclose example triplexers that may be included in the pluggable ONU transceiver module of FIG. 3.

As illustrated in FIG. 3, the optical triplexer 315 is positioned between the optical connector 305 and each of the transmit line (including laser 340 and laser driver 345), the first receive line (including receiver 320 and TIA 325) and the second receive line (including receiver 330 and TIA 335). FIG. 5A discloses an example of the optical triplexer 315 of FIG. 3. As illustrated in FIG. 5A, the optical triplexer 315 may include first, second, third and fourth ball lenses 505, 510, 515, 520 and first and second wavelength selective filters 525 and 530. The optical triplexer 315 may further include first and second blocking filters 535 and 540. FIG. 5A further illustrates an optical fiber 545, a first receiver 550, a second receiver 555 and a laser 560 that may correspond to, respectively, the optical fiber 310, the first receiver 320, the second receiver 330, and the laser 340 of FIG. 3.

In the example of FIG. 5A, the first ball lens 505 is positioned between the first optical receiver 550 and the first wavelength selective filter 525. The second ball lens 510 is positioned between the laser 560 and the first wavelength selective filter 525. The second wavelength selective filter 530 is positioned between the first wavelength selective filter 525 and the third ball lens 515. The fourth ball lens 520 is positioned between the second optical receiver 555 and the second wavelength selective filter 530. The first blocking filter 535 may be positioned between the first ball lens 505 and the first wavelength selective filter 525. The second blocking filter 540 may be positioned between the fourth ball lens 520 and the second wavelength selective filter 530.

Figure 5B:
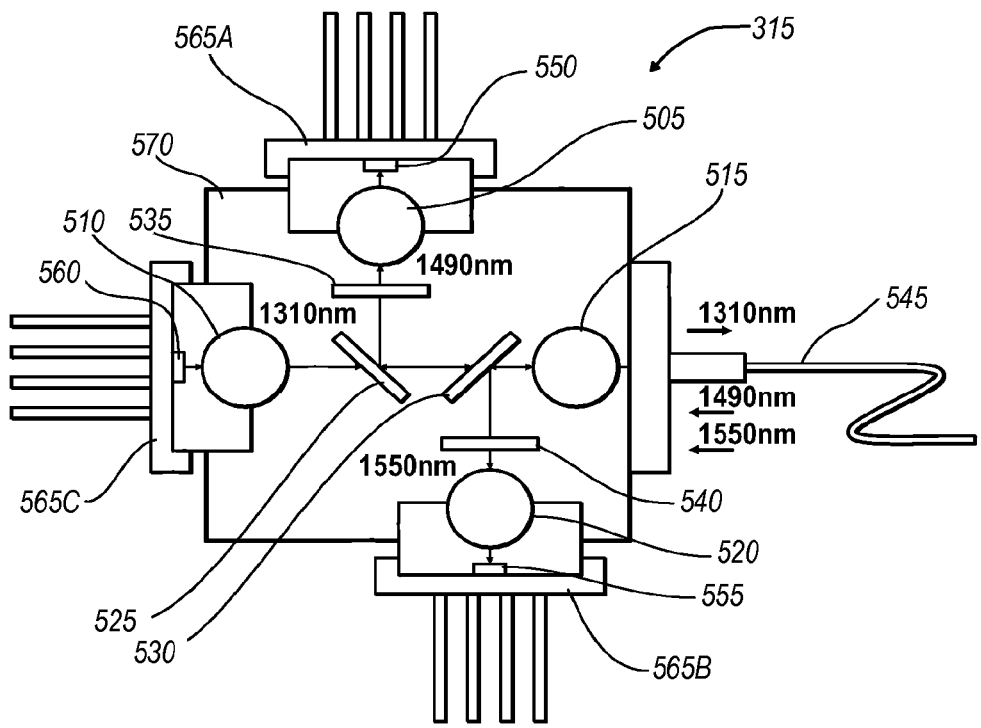

FIG. 5B illustrates additional details regarding an embodiment of the optical triplexer 315 of FIGS. 3 and 5A. FIG. 5B is similar in many respects to FIG. 5A, and like reference numbers designate like components. As illustrated in FIG. 5B, each of the first receiver 550, second receiver 555 and laser 560 may be contained within a respective optical subassembly (OSA) 565A, 565B, 565C. FIG. 5B illustrates that each optical subassembly 565A-565C may include, e.g., one or more leads, a header, and/or a can. FIG. 5B further illustrates that each of the first, fourth and second ball lenses 505, 520 and 510 may be incorporated into, respectively, the optical subassembly 565A, 565B and 565C. FIG. 5B further illustrates that the optical triplexer 315 can include a housing 570.

According to the embodiment of FIGS. 5A-5B, three pairs of ball lenses are provided with a collimated beam of optical signals between the ball lenses of each pair to achieve relatively high coupling (e.g., which may result in about 50% or more coupling efficiency). The pairs of ball lenses, and the wavelength of light collimated between each pair, may be as follows:

1. From second ball lens 510 to third ball lens 515: 1310 nm.
2. From third ball lens 515 to first ball lens 505: 1490 nm.
3. From third ball lens 515 to fourth ball lens 520: 1550 nm.

The embodiments disclosed herein may operate at any other optical wavelengths. Moreover, the wavelengths of the signals can be exchanged or otherwise varied. For example, any of the optical signals, such as those shown in FIGS. 5A and 5B, can have a wavelength between 375 nanometers and 1800 nanometers. Therefore, the invention is not limited to those specific wavelengths disclosed as examples herein.

The embodiments disclosed herein may exhibit one or more benefits over the prior art. For example, the embodiments may have relatively high laser to fiber coupling efficiency and low cost. The embodiments may have better optical filter performance (lower insertion loss and high isolation) because they are placed in the collimated beam. The embodiments may have better stability since coupling is not sensitive to angular movement of filters. The embodiments may have longer working distance which makes the design flexible such as adding extra components between two lenses without changing other parts. The embodiments may have lower aberration for receiver optics which also increases the receiver sensitivity and stability.

It should be understood that the drawings are diagrammatic and schematic representations of such example embodiments and, accordingly, are not limiting of the scope of the present invention, nor are the drawings necessarily drawn to scale. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. Detailed descriptions of apparatus and processing techniques known in the field of the invention to one of ordinary skill in the art have been excluded.

We claim:

1. A pluggable optical network unit (ONU) transceiver module comprising:
   an optical connector configured to connect to an optical fiber to access an optical network;
   a transmit line including:
     laser driver; and
     a laser;
   a first receive line including:
     a first optical receiver; and
     a first post amplifier;
   a second receive line including:
     a second optical receiver; and
     a second post amplifier;
   a single linear array of individual pins including input/output (I/O) and video pins and electrically coupled to the laser driver, first post amplifier, and second post amplifier, the individual pins each being physically spaced apart from one another; and
   an optical triplexer positioned between the optical connector and each of the transmit line and first and second receive lines, the optical triplexer comprising first, second, third and fourth ball lenses and first and second wavelength selective filters, wherein:
     the first ball lens is positioned between the first optical receiver and the first wavelength selective filter;
     the second ball lens is positioned between the laser and the first wavelength selective filter;
     the second wavelength selective filter is positioned between the first wavelength selective filter and the third ball lens; and
     the fourth ball lens is positioned between the second optical receiver and the second wavelength selective filter.

2. A pluggable ONU transceiver module according to claim 1, wherein the transmit line is configured to transmit a digital optical data signal to the optical network, the first receive line is configured to receive a digital optical data signal from the optical network, and the second receive line is configured to receive an analog optical video signal from the optical network.

3. A pluggable ONU transceiver module according to claim 1, wherein the video pins are disposed at an end of the single linear array of individual pins adjacent to the I/O pins.

4. A pluggable ONU transceiver module according to claim 1, wherein the array of individual pins are capable of being plugged into a corresponding receptacle.

5. A pluggable ONU transceiver module according to claim 1, wherein the pluggable optical network unit transceiver module includes twenty I/O pins and at least two video pins.

6. A pluggable ONU transceiver module according to claim 1, wherein a RF cable is not required for separate connection to the pluggable optical network unit transceiver module.

7. A pluggable ONU transceiver module according to claim 1, further comprising a heat dissipative component on a top surface of the module.

8. A pluggable ONU transceiver module according to claim 1, wherein the laser includes a VSCEL or a distributed feedback laser.

9. A pluggable ONU transceiver module according to claim 1, wherein the laser, first optical receiver, and second optical receiver are each associated with a signal wavelength of about 1310 nanometers, about 1490 nanometers, or about 1550 nanometers.

10. A pluggable ONU transceiver module according to claim 9, wherein the laser is associated with a signal wavelength of about 1310 nanometers, the first optical receiver is associated with a signal wavelength of about 1550 nanometers, and the second optical receiver is associated with a signal wavelength of about 1490 nanometers.

11. A pluggable ONU transceiver module according to claim 1, wherein the first post amplifier is a transimpedance amplifier (TIA) and the second post amplifier is a TIA.

12. A pluggable ONU transceiver module according to claim 1, wherein the optical connector is configured to connect to a single optical fiber for both upstream and downstream triplexed communication over the single optical fiber.

13. A pluggable ONU transceiver module according to claim 1, wherein the video signal includes CATV video which covers between 55 megahertz and 870 megahertz frequency range.

14. A pluggable ONU transceiver module according to claim 1, wherein the pluggable ONU transceiver module is configured to receive internet protocol television (IPTV) signal and convert the IPTV signal to a radio frequency signal.

15. A pluggable ONU transceiver module according to claim 1, further comprising tabs configured to aid in aligning the input/output and video pins with a receptacle of a printed circuit board (PCB) of an ONU box.

16. A pluggable ONU transceiver module according to claim 1, wherein the first optical receiver includes an avalanche photodiode and the second optical receiver includes a PIN photodiode.

17. A pluggable ONU transceiver module according to claim 1, wherein the single linear array of individual pins extends from the module at an orientation that is about perpendicular to a plane in which the transmit line, the first receive line, and the second receive line are positioned.

18. A pluggable optical network unit (ONU) transceiver module comprising:
   an optical connector configured to receive an end of an optical fiber to access an optical network;

a transmit line including:
  a laser driver; and
  a laser configured to generate a signal having a wavelength of about 1310 nanometers;
a first receive line including:
  a photodiode configured to receive an optical signal having a wavelength of about 1550 nanometers; and
  a first TIA;
a second receive line including:
  a second photodiode configured to receive an optical signal having a wavelength of about 1490 nanometers; and
  a second TIA;
a single linear array of individual pins including input/output (I/O) and video pins and electrically coupled to the laser driver, first post amplifier, and second post amplifier, the individual pins each being physically spaced apart from one another, wherein the transmit line is configured to transmit a digital optical data signal to the optical network, the first receive line is configured to receive a digital optical data signal from the optical network, and the second receive line is configured to receive an analog optical video signal from the optical network; and an optical triplexer positioned between the optical connector and each of the transmit line and first and second receive lines, the optical triplexer comprising first, second, third and fourth ball lenses and first and second wavelength selective filters, wherein:
  the first ball lens is positioned between the first wavelength selective filter and the photodiode of the second receive line;
  the second ball lens is positioned between the laser and the first wavelength selective filter;
  the second wavelength selective filter is positioned between the first wavelength selective filter and the third ball lens; and
  the fourth ball lens is positioned between the second wavelength selective filter and the photodiode of the first receive line.

19. A pluggable ONU transceiver module according to claim 18, wherein the single linear array of individual pins extends from the module at an orientation that is about perpendicular to a plane in which the transmit line, the first receive line, and the second receive line are positioned and the pins in the single linear array of individual pins are spaced apart from one another at substantially regular intervals.

* * * * *

UNITED STATES PATENT AND TRADEMARK OFFICE
CERTIFICATE OF CORRECTION

PATENT NO. : 8,160,451 B2
APPLICATION NO. : 12/030555
DATED : April 17, 2012
INVENTOR(S) : Liu et al.

It is certified that error appears in the above-identified patent and that said Letters Patent is hereby corrected as shown below:

On the Face Page, in Field (73), under "Assignee", in Column 1, Line 1, delete "Finisar Corporation, Inc." and insert -- Finisar Corporation --, therefor.

Signed and Sealed this
Twenty-eighth Day of August, 2012

David J. Kappos
*Director of the United States Patent and Trademark Office*